(12) United States Patent
Norton

(10) Patent No.: US 10,097,013 B2
(45) Date of Patent: Oct. 9, 2018

(54) BATTERY MANAGEMENT SYSTEM AND METHOD FOR MANAGING ISOLATION AND BYPASS OF BATTERY CELLS

(75) Inventor: Kenneth Hamilton Norton, Guangdong (CN)

(73) Assignee: CHEEVC LTD, Fife (GB)

( * ) Notice: Subject to any disclaimer, the term of this patent is extended or adjusted under 35 U.S.C. 154(b) by 272 days.

(21) Appl. No.: 13/885,329

(22) PCT Filed: Nov. 25, 2010

(86) PCT No.: PCT/CN2010/079125
§ 371 (c)(1),
(2), (4) Date: May 14, 2013

(87) PCT Pub. No.: WO2012/068734
PCT Pub. Date: May 31, 2012

(65) Prior Publication Data
US 2013/0234667 A1   Sep. 12, 2013

(51) Int. Cl.
*H02J 7/00* (2006.01)
*H01M 10/44* (2006.01)

(52) U.S. Cl.
CPC ......... *H02J 7/0016* (2013.01); *H01M 10/441* (2013.01); *H02J 7/007* (2013.01); *H02J 7/0014* (2013.01); *Y02T 10/7055* (2013.01)

(58) Field of Classification Search
CPC .............................. H02J 7/0016; H02J 7/0014
(Continued)

(56) References Cited

U.S. PATENT DOCUMENTS 4,061,955 A   12/1977 Thomas et al.
5,773,962 A *  6/1998 Nor .............................. 320/134
(Continued)

FOREIGN PATENT DOCUMENTS

| CN | 1367565 A | 9/2002 |
| CN | 1601804 | 3/2005 |
| JP | 2010239711 A | 10/2010 |

OTHER PUBLICATIONS

International Search Report for PCT/CN2010/079125 dated Aug. 18, 2011.
(Continued)

*Primary Examiner* — Richard Isla Rodas
*Assistant Examiner* — Manuel Hernandez
(74) *Attorney, Agent, or Firm* — Dorsey & Whitney LLP

(57) ABSTRACT

A battery management system can be provided which can include a plurality of battery management units connected in series and a host controller. Each battery management unit can include a battery cell, an isolation element, and at least one bypass element. The isolation element is connected with the battery cell in series, and the battery cell is isolated by turning off the isolation element. The bypass elements can be in parallel connection with the battery cell and isolation element, and the battery cell is bypassed by turning on the bypass element. A battery management method can include: activating the battery cell of the battery management unit by turning on the isolation element and turning off the bypass elements of the battery management unit; and deactivating the battery cell of the battery management unit by turning off the isolation element and turning on the bypass elements of the battery management unit.

15 Claims, 6 Drawing Sheets

(58) Field of Classification Search
USPC .............................. 320/122, 116, 120, 121
See application file for complete search history.

(56) References Cited

U.S. PATENT DOCUMENTS

| | | | |
|---|---|---|---|
| 6,265,846 B1 | 7/2001 | Flechsig et al. | |
| 6,420,852 B1* | 7/2002 | Sato | 320/134 |
| 6,599,655 B2* | 7/2003 | Johnson | B64G 1/425 320/116 |
| 2002/0171400 A1 | 11/2002 | Koyama et al. | |
| 2003/0160593 A1* | 8/2003 | Yau et al. | 320/116 |
| 2005/0068005 A1* | 3/2005 | Yamashita | 320/116 |
| 2009/0208824 A1* | 8/2009 | Greening | G06F 1/189 429/91 |
| 2010/0164430 A1 | 7/2010 | Lu et al. | |
| 2010/0244781 A1* | 9/2010 | Kramer | H02J 7/0016 320/162 |
| 2011/0057617 A1* | 3/2011 | Finberg et al. | 320/118 |
| 2011/0078470 A1* | 3/2011 | Wang et al. | 713/320 |
| 2012/0086400 A1* | 4/2012 | White | H02J 7/0016 320/118 |
| 2012/0091963 A1* | 4/2012 | Vance et al. | 320/118 |
| 2012/0313560 A1 | 12/2012 | Hambitzer et al. | |
| 2013/0026992 A1* | 1/2013 | Ruan et al. | 320/118 |
| 2013/0241472 A1* | 9/2013 | Feuerstack et al. | 320/107 |

OTHER PUBLICATIONS

International Written Opinion for PCT/CN2010/079125 dated Aug. 18, 2011.
European search report dated Nov. 8, 2016 for EP Application No. 10859988.7, (7 pages).

\* cited by examiner

BATTERY MANAGEMENT SYSTEM AND METHOD FOR MANAGING ISOLATION AND BYPASS OF BATTERY CELLS

CROSS-REFERENCE TO RELATED APPLICATION(S)

The present application relates to and claims priority from International Patent Application No. PCT/CN2010/079125 filed Nov. 25, 2010. The entire disclosure of the above-identified application is hereby incorporated by reference in its entirety.

FIELD OF THE INVENTION

The present invention relates to the field of battery management, and particularly to a battery management system and method for improving the reliability and extending the performance of Lithium battery packs appropriate to light electric vehicles.

BACKGROUND OF THE INVENTION

The most stressful situation for a battery's working environment is to be under a constant and heavy load. This is exactly the characteristic of an electric vehicle application. A battery with an intermittent load allows a level of electrochemical recovery during periods of very low or zero load. This is especially evident in Lead Acid cells but is a feature of all cell chemistries. Because of the time-constant associated with this behavior, a quiescent rest period is especially beneficial in extending the operating lifetime. A redundant cell isolation philosophy enables this recovery.

In an electric vehicle application there is a requirement for an additional motor speed controller to respond to demands from the throttle system. These units are relatively bulky and represent an increase in weight and cost which is particularly significant for a light electric vehicle or electric bike. A cell bypass system can replicate this function without need for the additional component, offering significant savings in both cost and weight.

A Photovoltaic array operated under lower light conditions such as in Northern latitudes or on an overcast day for example may not achieve the output voltage required to charge a battery system. If some of the cells are bypassed however to lower the battery voltage it may be possible to capture power in less than ideal circumstances.

Detailed descriptions regarding a controlling system and method about battery powered device are disclosed in other documents such as U.S. Pat. No. 6,744,698 by Shunsuke Koyama et al. Shunsuke Koyama et al disclose that when a battery is used for an extended period, characteristics deteriorate and the internal resistance in particular increases. Shunsuke Koyama et al further disclose an electronic device which comprises: a battery, a plurality of load groups, a first control unit and a second control unit. The load groups includes a heavy load group that is comprised of a plurality of heavy load units driven by the battery and a light load group that is comprised of a plurality of light load units and that consumes less power than the heavy load group. When the output voltage of the battery drops below the first threshold voltage, the first control unit (i) stops monitoring the output voltage of the battery, (ii) disables the supply of power from the battery to the heavy load group, the disabled power state of the heavy load group being maintained regardless of any future change in the output voltage of the power supply, and (iii) outputs an activation signal to activate the second control unit. The system and method described by Shunsuke Koyama et al can stop driving the heavy load unit with the battery when the battery output voltage drops to the threshold voltage and give the battery some time for recovery. But Shunsuke Koyama et al do not disclose or suggest a system or method that can be applied for managing a plurality of battery cells connected with each other in series, especially in light electric vehicles.

SUMMARY OF THE INVENTION

It is an object of the invention to improve and extend the performance and feature set of a batteries pack system.

In a first aspect of the present invention, there is provided a battery management system comprising: a plurality of battery management units and a host controller. Each battery management unit comprises: a battery cell, an isolation element connected with the battery cell in series for isolating the battery cell, and at least one bypass element in parallel connection with the battery cell and the isolation element, which are for bypassing the battery cell. Each battery management unit is connected with each other in series.

Optionally, the host controller is coupled with the isolation elements and the bypass elements, and manages turning on and off of the isolation elements and the bypass elements.

Optionally, the host controller comprises an integrated System On Chip device having sufficient general purpose input/output connections to drive all the isolation elements and the bypass elements.

Optionally, the host controller comprises: a microprocessor having sufficient general purpose input/output connections to drive all the isolation elements and the bypass elements.

Optionally, the host controller further comprises a non-volatile memory element for storing the embedded algorithm and battery cells usage history.

Optionally, external addressable latches are used to increase general purpose input/output connections to drive all the isolation elements and the bypass elements.

Optionally, the isolation elements and the bypass elements are coupled with the general purpose input/output connections of the host controller via appropriate voltage level shifting circuitry.

Optionally, the isolation elements consist of MOSFETS or relays which are of appropriate power rating for the particular battery cells employed and present an impedance which is an order of magnitude less than the internal impedance of the battery cells.

Optionally, the battery management system is realized either wholly or partly in a single integrated circuit.

In a second aspect of the present invention, there is provided a battery management method for a battery management system which comprises a plurality of battery management units connected with each other in series, comprising:
    activating a battery cell of a battery management unit by turning on an isolation element and turning off one or more bypass elements of the battery management unit; and
    deactivating the battery of the battery management unit by turning off the isolation element and turning on one or more bypass elements of the battery management unit.

Optionally, the host controller activates or deactivates a plurality of battery cells at the same time.

Optionally, the host controller tracks battery cells usage history and storing the battery cells usage history in a non-volatile memory element during periods of inactivity.

Optionally, the host controller starts from a top battery management unit, a bottom battery management unit or any intermediate battery management unit, for balancing the usage and stress placed on each individual battery management unit.

In a third aspect of the present invention, there is provided a battery management method for periodic cycling of a redundant battery cell of a battery cells series string in order to benefit from quiescent recovery of the redundant battery cell, comprising:
  judging a redundant battery cell according to history of battery cells stored in a non-volatile memory element;
  turning off an isolation element which is in a same battery management unit with the redundant battery cell, to isolate the redundant battery cell;
  turning on all bypass elements which are in the same battery management unit with the redundant battery cell for maintaining the overall connection of the battery cells series string; and after a quiescent recovery period, turning off the bypass elements and turning on the isolation element for reconnecting the redundant cell in the battery cells series sting.

Optionally, the host controller isolates each battery cell in the battery cells series string in a cyclic manner, thus reducing stress on each individual cell and extending performance of the battery cells.

Optionally, the host controller tracks the battery cells usage history and stores the battery cells usage history in the non-volatile memory element during periods of inactivity.

Optionally, the host controller starts from a top battery management unit, a bottom battery management unit or any intermediate battery management unit, for balancing the usage and stress placed on each individual battery management unit.

In a fourth aspect of the present invention, there is provided a battery management method for softly starting a battery management system to reduce high inrush current spikes which may damage or reduce battery performance, comprising: activating all battery management units incrementally over a short time period on an initial demand.

Optionally, the host controller starts from a top battery management unit, a bottom battery management unit or any intermediate battery management unit in the series string, in order to balance the usage and stress placed on each individual battery management unit.

Optionally, the host controller tracks cells usage history and stores the cells usage history in the non-volatile memory element.

In a fifth aspect of the present invention, there is provided a battery management method for voltage regulation which comprises a plurality of battery management units connected in a series string, comprising: activating or deactivating the battery management units incrementally in response to an external demand.

In a sixth aspect of the present invention, there is provided a battery management method for voltage reduction which comprises a plurality of battery management units connected in a series string, comprising: activating or deactivating the battery management units incrementally during charging in response to an output from a photo-voltaic panel or other varying voltage source.

BRIEF DESCRIPTION OF THE DRAWINGS

FIGS. 4a-4d are diagrams illustrating a battery management method according to one embodiment of the present invention, wherein FIGS. 4a-4c shows a battery management method for softly starting a battery management system according to one embodiment of the present invention, and FIGS. 4c-4d shows a battery management method for isolating and bypassing a single battery cell according to one embodiment of the present invention.

DETAILED DESCRIPTION OF THE EMBODIMENTS

While the invention herein disclosed has been described by means of specific embodiments and applications thereof, numerous modifications and variations could be made thereto by those skilled in the art without departing from the scope of the invention set forth in the claims.

Figure 1:
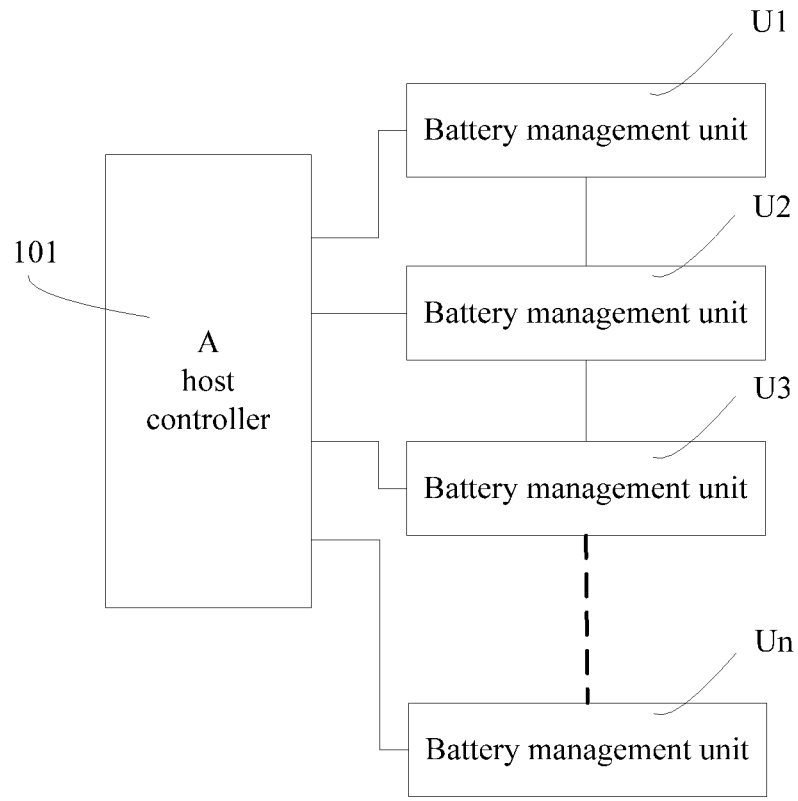
FIG. 1 is a structure schematic diagram of a battery management system according to one embodiment of the present invention.

FIG. 1 is a structure schematic diagram of a battery management system according to one embodiment of the present invention. The battery management system comprises a host controller 101 and a plurality of battery management units U1 to Un. The battery management units U1 to Un are connected with each other in a series string.

Figure 2:
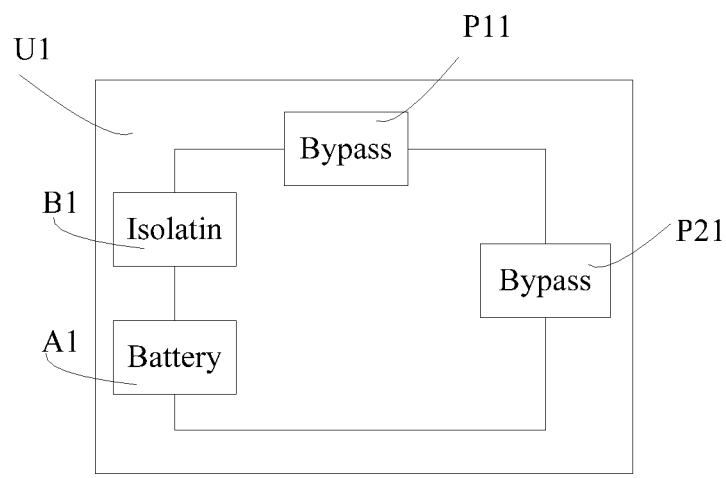
FIG. 2 is a structure schematic diagram of a battery management unit according to one embodiment of the battery management system shown in FIG. 1.

FIG. 2 is a structure schematic diagram of a battery management unit according to one embodiment of the battery management system shown in FIG. 1. The battery management unit U1 comprises: a battery cell A1, an isolation element B1 and two bypass elements P11 and P21. The isolation element B1 is connected with the battery cell A1 in series and isolates the battery cell A1 by turning off the isolation element B1. The bypass element P11 and P21 are in parallel connection with the battery cell A1 and the isolation element B1, and bypass the battery cell A1 by turning on the bypass element P11 and P21.

Figure 3:
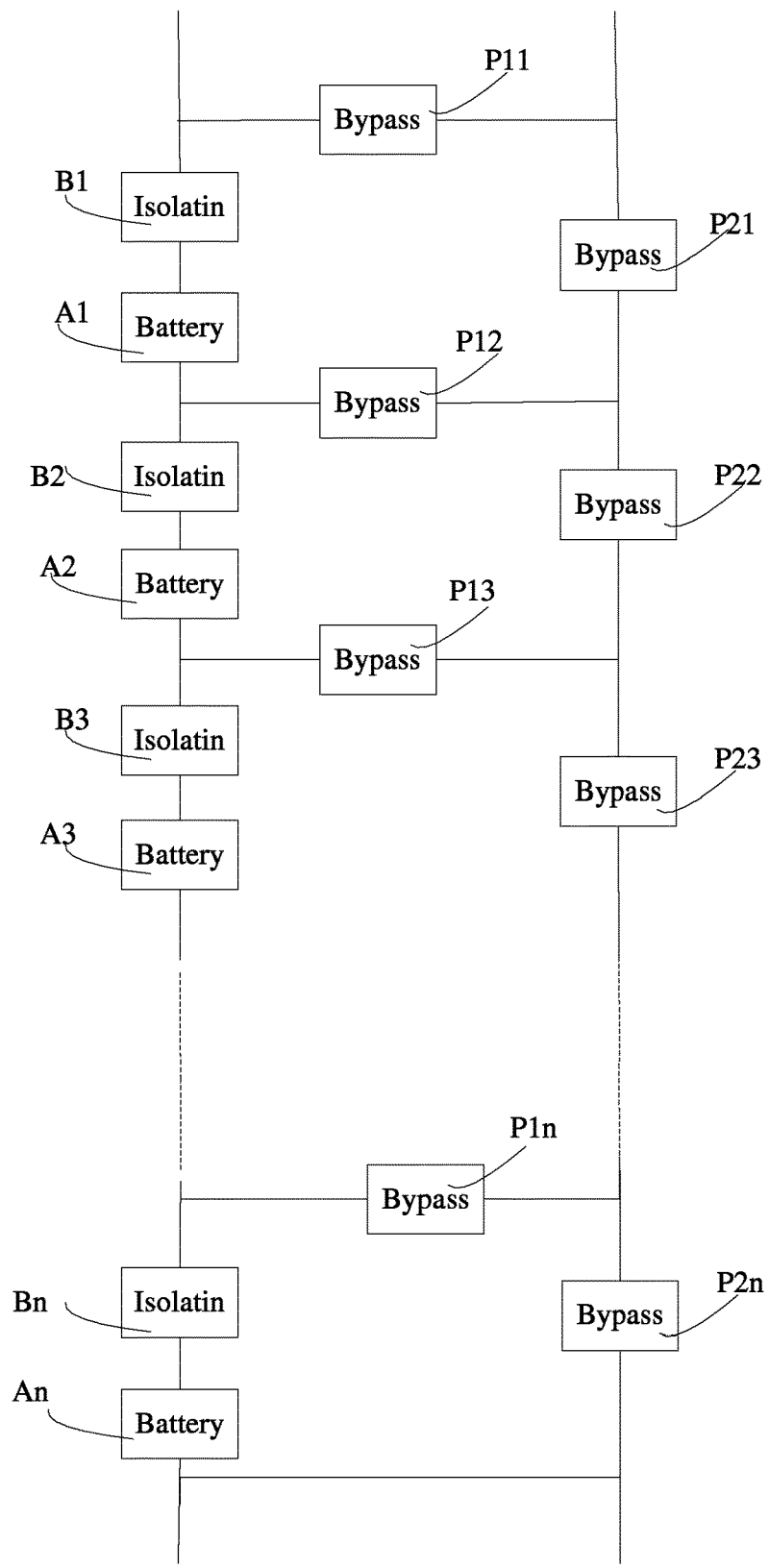
FIG. 3 is a schematic diagram of a plurality of battery management units connected in series according to one embodiment of the battery management system shown in FIG. 2.

FIG. 3 is a schematic diagram of a plurality of battery management units connected in series according to one embodiment of the battery management system shown in FIG. 2.

Optionally, the host controller 101 is coupled with the isolation elements B1 to Bn and the bypass elements P11 to P1$n$ and P21 to P2$n$, and manages turning on and off of the isolation elements B1 to Bn and the bypass elements P11 to P1$n$ and P21 to P2$n$ via an embedded algorithm.

Optionally, the host controller 101 comprises an integrated System On Chip device having sufficient general purpose input/output connections to drive all the isolation elements B1 to Bn and the bypass elements P11 to P1$n$ and P21 to P2$n$.

Optionally, the host controller 101 comprises a microprocessor having sufficient general purpose input/output connections to drive all the isolation elements B1 to Bn, the bypass elements P11 to P1$n$ and P21 to P2$n$.

Optionally, the host controller further comprises a non-volatile memory element for storing the embedded algorithm and battery cells usage history.

Optionally, the host controller could be MSP430 for low power applications and C2000 or Cortex M3 devices which include an interface for a CAN transceiver.

Optionally, external addressable latches are used to increase general purpose input/output connections to drive all the isolation elements and the bypass elements.

Optionally, the isolation elements B1 to Bn and the bypass elements P11 to P1n and P21 to P2n are connected to the general purpose input/output connections of the host controller via appropriate voltage level shifting circuitry.

Figure 4A:
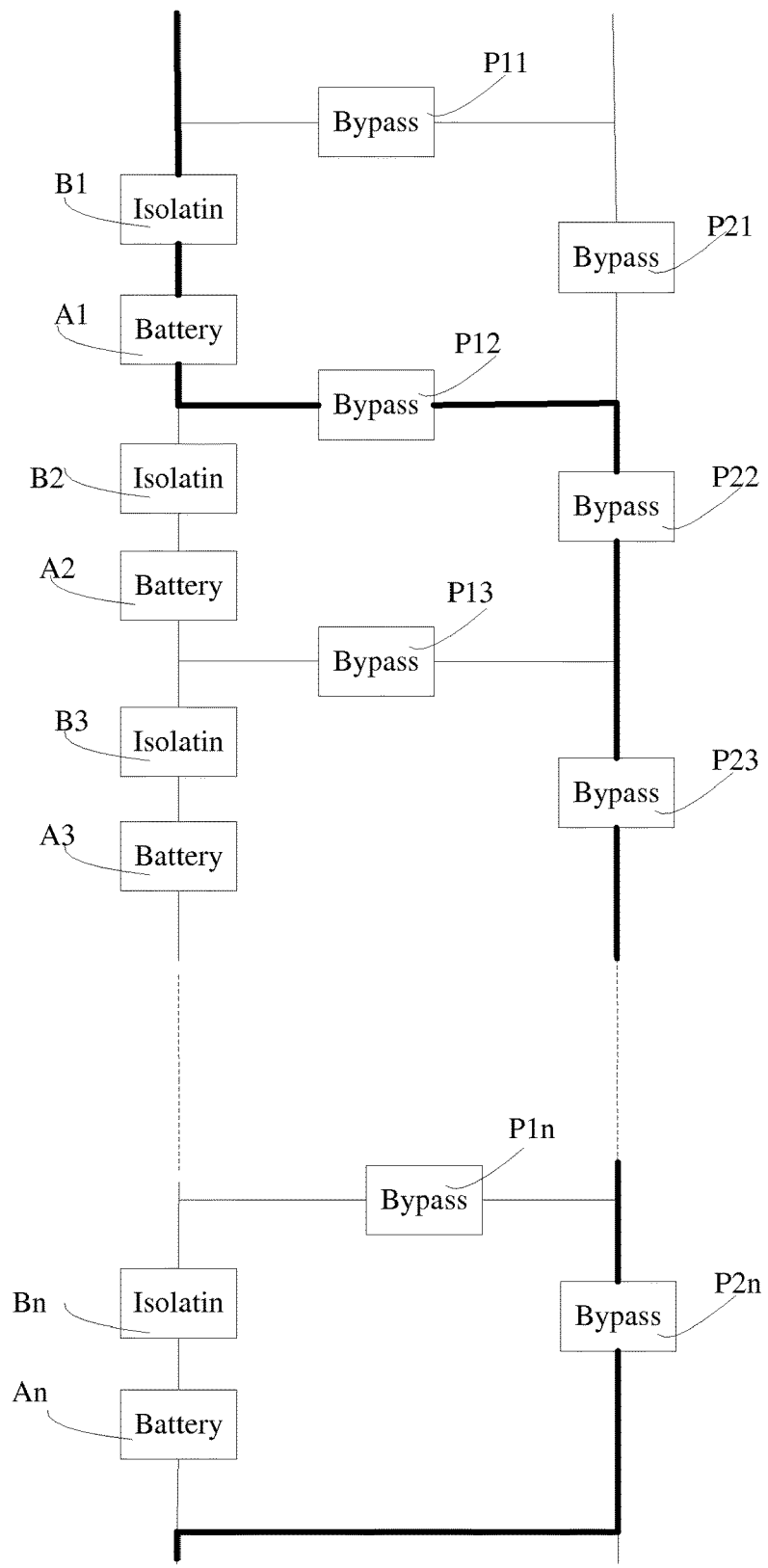
Figure 4B:
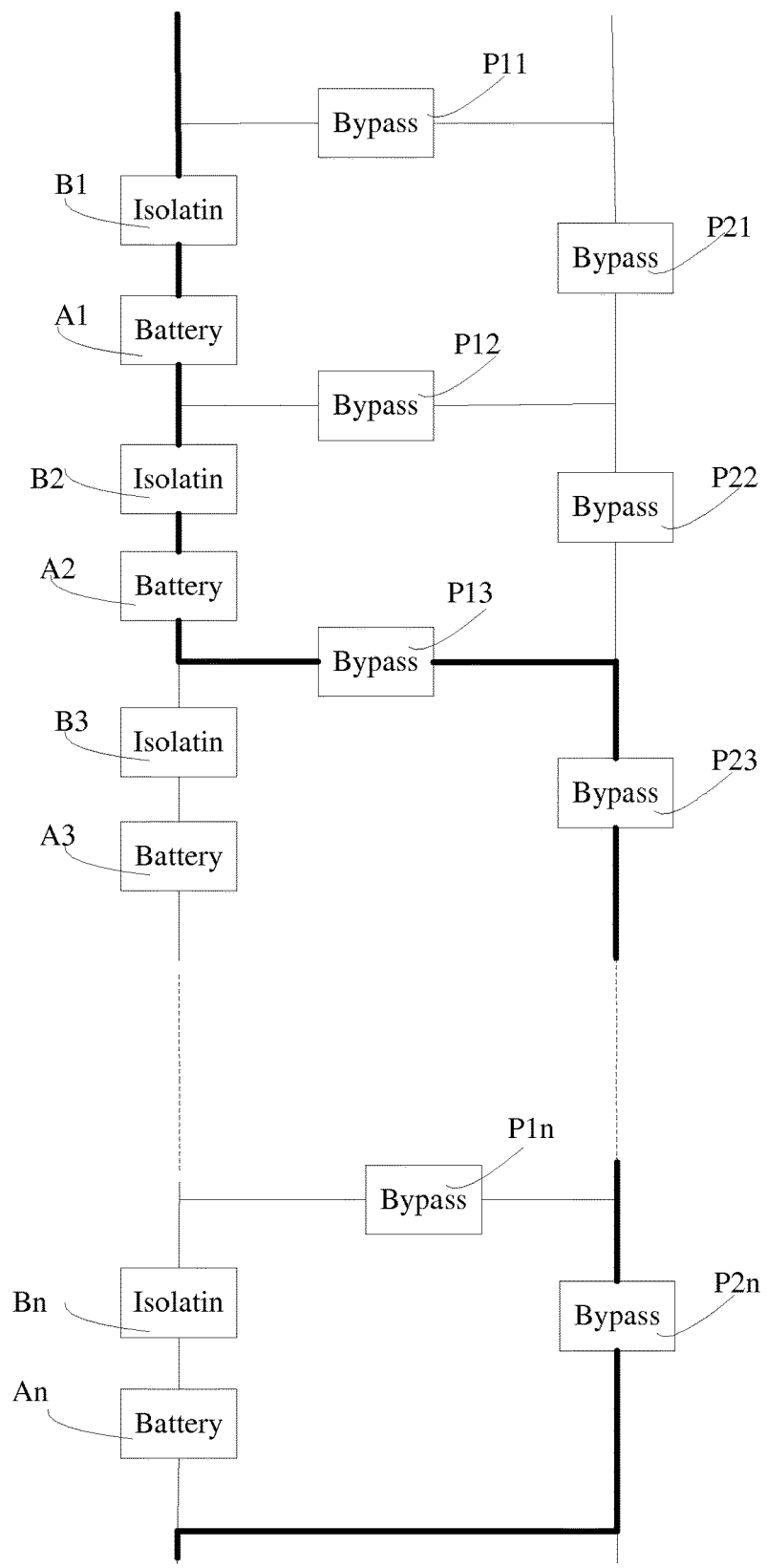
Figure 4C:
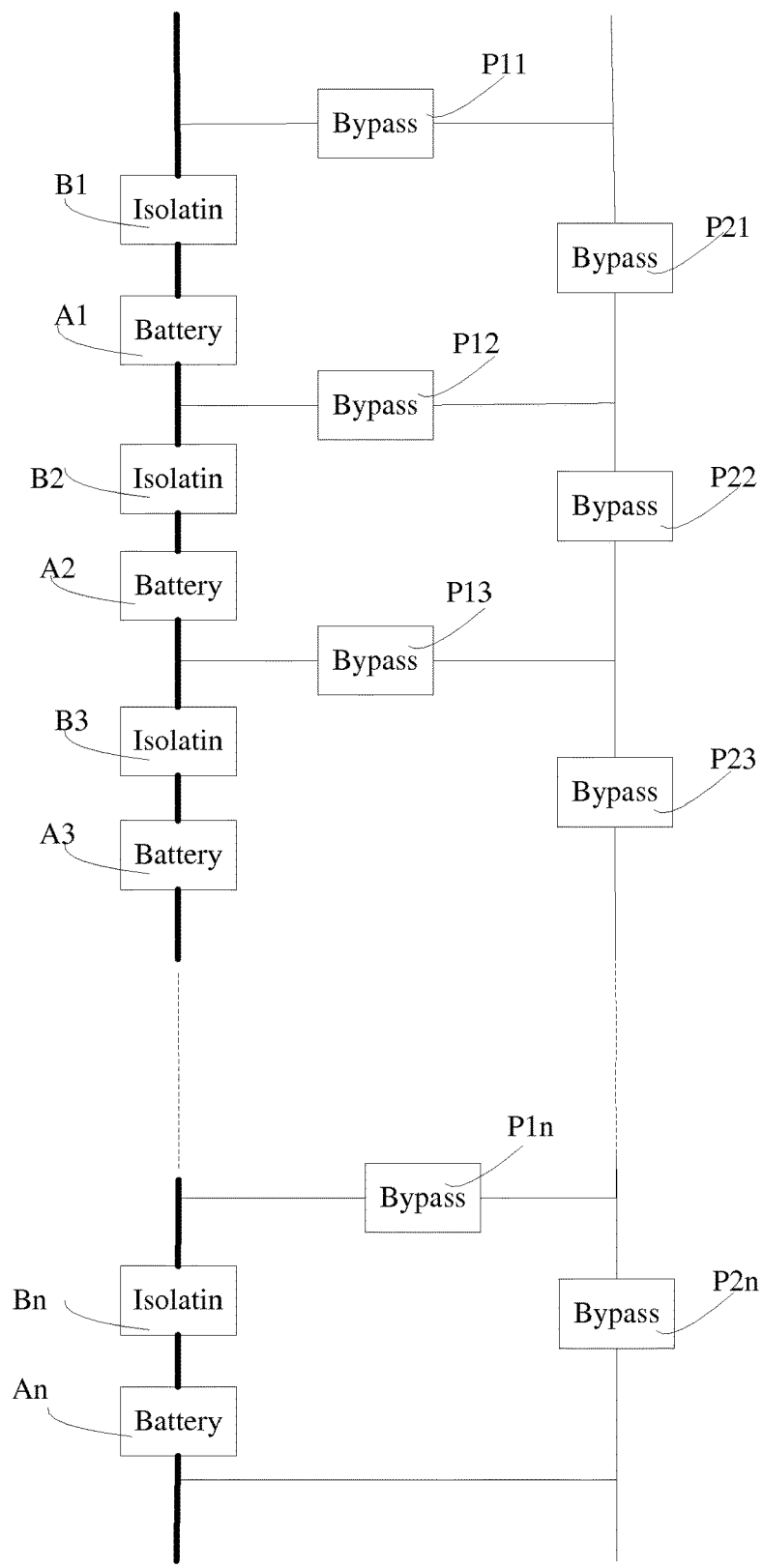

Optionally, the isolation elements B1 to Bn and the bypass elements P11 to P1n and P21 to P2n are MOSFETS or relays which are of appropriate power rating for the particular battery cells employed and present an impedance which is an order of magnitude less than the internal impedance of the battery cells FIGS. 4a-4c are diagrams illustrating a battery management method according to one embodiment of the present invention. The main current path is indicated by the bold lines. As shown in FIG. 4a, a host controller of a battery management system activates a battery cell A1 of a battery management unit U1 by turning on an isolation element B1 and turning off bypass elements P11 and P21 of the battery management unit U1. Meanwhile, the host controller deactivates the battery cell A2 to An of the battery management units U2 to Un by turning off isolation element B2 to Bn, and turning on bypass elements P12 to P1n and bypass elements P22 to P2n of the battery management units U2 to Un.

Similarly, the host controller activates battery cells A1 and A2 of battery management unit U1 and U2 at the same time, as shown in FIG. 4b, by turning on isolation elements B1 and B2, and turning off bypass elements P11, P21, P12 and P22 of the battery management unit U1 and U2. Meanwhile, the host controller keeps the battery cell A3 to An of the battery management units U3 to Un not being activated by keeping isolation element B3 to Bn not conducted and bypass elements P13 to P1n and bypass elements P23 to P2n of the battery management units U3 to Un conducted. This also can be performed on three or more battery management units at the same time.

FIG. 4c is a schematic diagram that all the battery cells are activated. As shown in FIG. 4c, all the isolation elements B1 to Bn of the battery management units U1 to Un are turned on, and all the bypass elements P11 to P1n and P21 to P2n of the battery management units U1 to Un are turned off.

Figure 4D:
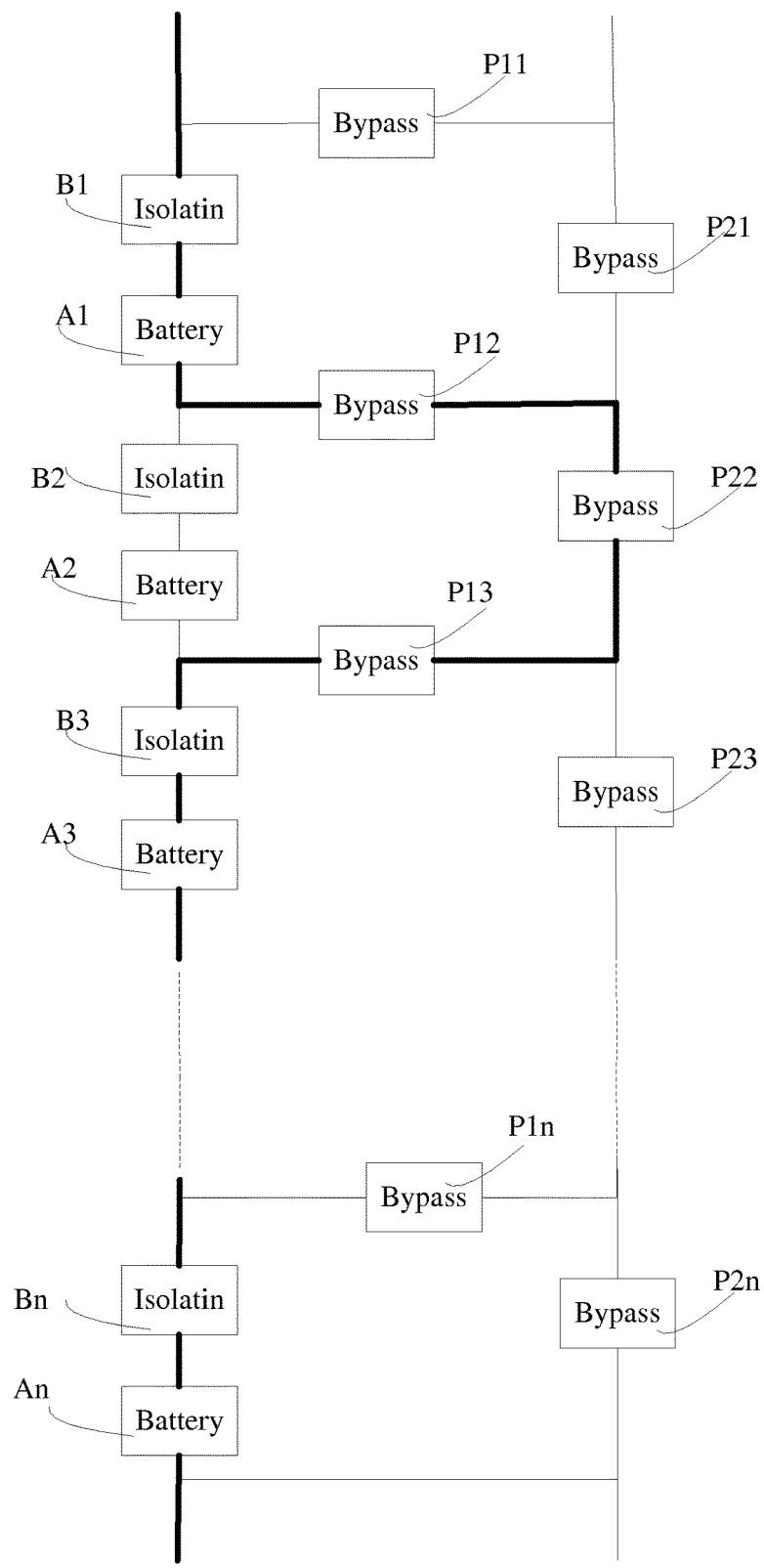

In a second embodiment of the method described in FIGS. 4c to 4d, there is provided a battery management method allowing the isolation and bypass of a single cell for the purpose of quiescent recovery. As shown in FIG. 4d, the host controller deactivates the battery cell A2 of the battery management unit U2 by turning off the isolation element B2, turning on the bypass elements P12, P22 and P13. Meanwhile, the host controller keeps the battery cell A1, and A3 to An being activated by keeping isolation element B1, B3 to Bn on and bypass elements P11, P14 to P1n, P21, and P23 to P2n off.

After a period of quiescent recovery the battery cell A2 is reconnected by ensuring that isolation elements B2 is turned on and bypass elements P12, P22 and P13 are turned off, which is shown in FIG. 4c. This is then repeated alternately for every battery cell in the series string under the management of the host controller thus ensuring that every battery cell benefits from a period of quiescent recovery. This cyclic recovery extends the performance of the battery pack as a whole and reduces the stress on each individual cell.

In a third embodiment of the battery management method described in FIGS. 4a to 4c, there is provided a battery management method allowing the isolation and bypass of multiple battery cells simultaneously by the host controller thus providing the ability to "soft start" the battery management system to reduce high inrush current spikes which may damage or reduce the battery performance in any way. As shown in FIGS. 4a and 4b, the battery cell A1 is activated by the host controller firstly, and the battery cell A2 is activated subsequently. This can be repeated incrementally for every battery cell in the battery management system over a short time period on an initial demand under the management of the host controller until the full battery pack voltage is available for the application, as shown in FIG. 4c, thus reducing high inrush current spikes which may damage or reduce the battery cells performance in any way.

In a fourth embodiment of the battery management method described in FIGS. 4a to 4d, there is provided a battery management method allowing a variable voltage regulation and speed control for a motor based system such as an electric vehicle. A host controller decides the number of the battery cells that should be activated in response to an external demand, and then turning on or off related isolation elements and bypass elements. In this embodiment, the requirement for a separate speed controller may be mitigated which will represent a cost saving for the overall system.

In a fifth embodiment of the battery management method described in FIGS. 4a to 4d, there is provided a battery management method for voltage reduction which comprises a plurality of battery management units connected in a series string. A host controller activates or deactivates the battery management units incrementally during charging in response to an output from a photo-voltaic panel or other varying voltage source. This embodiment allows for reducing the battery cells voltage in a photo-voltaic system, allowing energy capture in less than ideal conditions.

Although the present invention has been disclosed as above with reference to preferred embodiments thereof but will not be limited thereto. Those skilled in the art can modify and vary the embodiments without departing from the spirit and scope of the present invention. Accordingly, the scope of the present invention shall be defined in the appended claims.

What is claimed is:

1. A battery management system, comprising:
   a host controller; and
   a plurality of battery management units connected with each other in series, and each battery management unit comprising:
      a battery cell;
      one or more isolation elements connected with the battery cell in series for disconnecting the battery cell; and
      one or more bypass elements provided in a parallel connection with the battery cell and the one or more isolation elements for bypassing the battery cell
      wherein the host controller is coupled with the isolation elements and the bypass elements of the battery management units,
   wherein the host controller is configured to control the isolation elements and the bypass elements of the battery management units to disconnect or reconnect the battery cells of the battery management units to provide each battery cell with a period for quiescent recovery, by way of:
   disconnecting a first battery cell of a first battery management unit for a first period of time, while keeping other battery cells of other battery management units activated and connected in series with each other; and
   at the end of the first period of time, reconnecting the first battery cell of the first battery management unit, and disconnecting a second battery cell of a second management unit for a second period of time, wherein the host controller is further configured to activate the battery management units incrementally over a predetermined time period on an initial demand to softly start the battery management system so as to reduce high inrush current spikes which may damage or reduce battery performance, by activating only one cell each time until all of the battery cells are activated, including:

activating only the first battery cell; and in response to the first battery cell being activated, activating only the second battery cell to be connected to the first battery cell in series.

2. The battery management system according to claim 1, wherein the host controller is operable to manage turning on and off of the one or more isolation elements and the one or more bypass elements with the plurality of battery management units under load.

3. The battery management system according to claim 1, wherein:

the host controller is operable to disconnect the first battery cell of the first battery management unit by turning off a first isolation element of the first battery management unit and turning on at least one first bypass element of the first battery management unit, the host controller is operable to maintain the other battery cells of the other battery management units activated by keeping the one or more isolation elements of the other battery management units on and keeping bypass elements of the other battery management units off, and the host controller is operable to reconnect the first battery cell of the first battery management unit at the end of the first period of time by turning on the first isolation element of the first battery management unit and turning off a first one of the one or more bypass elements of the first battery management unit.

4. The battery management system according to claim 1, wherein the host controller further comprises a non-volatile memory element for storing an embedded procedure, and utilized by the host controller to manage the turning on and off of the one or more isolation elements and the one or more bypass elements, and for storing a usage history of the battery cells.

5. The battery management system according to claim 1, wherein the first period of time is equal to the second period of time.

6. The battery management system according to claim 1, wherein the host controller is configured to control the isolation elements and the bypass elements of the battery management units to disconnect or reconnect the battery cells of the battery management units to provide each battery cell with a period for quiescent recovery during supplying power to a load by the battery management system.

7. A battery management method for a battery management system which comprises a plurality of battery management units, wherein each of the battery management units has a battery cell, the battery management units being connected with each other in series, the method comprising:

deactivating a first battery cell of the plurality of battery management units for a first period of time by turning off an isolation element of a first one of the plurality of battery management units and turning on one or more bypass elements of the first battery management unit, while keeping other batter cells of other batter management units connected in series with each other; and at the end of the first period of time, activating the first battery cell by turning on the isolation element of the first battery management unit and turning off the one or more bypass elements of the first battery management unit and deactivating a second battery cell of the plurality of battery management units for a second period of time, and the method further comprising:

activating the battery management units incrementally over a predetermined time period on an initial demand to softly start the battery management system so as to reduce high inrush current spikes which may damage or reduce battery performance, by activating only one cell each time until all of the battery cells are activated, including:

activating only the first battery cell; and in response to the first battery cell being activated, activating only the second battery cell to be connected to the first battery cell in series.

8. The battery management method according to claim 7, further comprising tracking usage history of the battery cells, and storing the usage history in a non-volatile memory element during periods of inactivity.

9. The battery management method according to claim 7, further comprising balancing a usage and a stress placed on each individual units of the battery management units starting from a top battery management unit, a bottom battery management unit or any intermediate battery management unit.

10. A battery management method for a periodic cycling of a redundant battery cell of a battery cells series string to benefit from a quiescent recovery of the redundant battery cell, the method comprising:

turning off an isolation element which is in a same battery management unit with a first battery cell for disconnecting the first battery cell for a first period of time;

turning on at least one bypass element which is in the same battery management unit with the first battery cell for maintaining other battery cells of the battery cells series string activated and connected in series with each other; and at the end of the first period of time, turning off the at least one bypass element and turning on the isolation element for reconnecting the first battery cell in the battery cells series string, turning off an isolation element which is in a same battery management unit with a second battery cell for disconnecting the second battery cell for a second period of time, and turning on at least one bypass element which is in the same battery management unit with the second battery cell for maintaining an overall connection of the battery cells series string, and the method further comprising:

activating the battery cells incrementally over a predetermined time period on an initial demand to softly start the battery cells series string so as to reduce high inrush current spikes which may damage or reduce battery performance, by activating only one cell each time until all of the battery cells are activated, including:

activating only the first battery cell; and in response to the first battery cell being activated, activating only the second battery cell to be connected to the first battery cell in series.

11. The battery management method according to claim 10, further comprising tracking a usage history of the battery cells and storing the usage history in a non-volatile memory element during periods of inactivity.

12. The battery management method according to claim 10, further comprising balancing a usage and a stress placed on each individual cell of the battery cells starting from a top battery cell, a bottom battery cell or any intermediate battery cell.

13. A battery management method for a voltage regulation which comprises a plurality of battery management units connected in a series string, the method comprising:

deactivating a first battery cell of the plurality of battery management units for a first period of time, by turning off an isolation element of a first one of the plurality of battery management units and turning on at least one bypass element of the first battery management unit, while keeping other battery cells of other battery management units activated and connected in series with each other;

at the end of the first period of time, activating the first battery cell by turning on the isolation element of the first battery management unit and turning off the at least one bypass elements of the first battery management unit, and deactivating a second battery cell of the plurality of battery management units for a second period of time; and activating or deactivating the battery management units incrementally in response to an output from a photovoltaic panel, and the method further comprising:

activating the battery management units incrementally over a predetermined time period on an initial demand to softly start the series string so as to reduce high inrush current spikes which may damage or reduce battery performance, by activating only one cell each time until all of the battery cells are activated, including:

activating only the first battery cell; and in response to the first battery cell being activated, activating only the second battery cell to be connected to the first battery cell in series.

14. The battery management method according to claim 13, further comprising judging a redundant battery cell according to usage history of the battery cells stored in a non-volatile memory element.

15. A battery management method for a voltage regulation which comprises a plurality of battery management units connected in a battery cell series string, the method comprising:

turning off an isolation element which is in a same unit of the battery management units with a first battery cell for disconnecting the first battery cell for a first period of time;

turning on at least one bypass element which is in the same unit with the first battery cell for maintaining other batter cells of the battery cells series string activated and connected in series with each other; and at the end of the first period of time, turning off the at least one bypass element and turning on the isolation element for reconnecting the first battery cell in the battery cells series string; and turning off an isolation element which is in a same battery management unit with a second battery cell for disconnecting the second battery cell for a second period of time, and turning on at least one bypass element which is in the same battery management unit with the second battery cell for maintaining an overall connection of the battery cells series string; and activating or deactivating the battery management units incrementally during charging in response to an output from a photovoltaic panel, and the method further comprising:

activating the battery management units incrementally over a predetermined time period on an initial demand to softly start the battery cell series string so as to reduce high inrush current spikes which may damage or reduce battery performance, by activating only one cell each time until all of the battery cells are activated, including:

activating only the first battery cell; and in response to the first battery cell being activated, activating only the second battery cell to be connected to the first battery cell in series.

* * * * *